(12) United States Patent
Lee et al.

(10) Patent No.: US 12,405,874 B2
(45) Date of Patent: Sep. 2, 2025

(54) METHOD AND SYSTEM FOR DETECTING ANOMALY BY USING GROUPED ARTIFICIAL INTELLIGENCE MODELS TRAINED TO DETECT AN ANOMALY IN A DETECTION TARGET

(71) Applicant: SAMSUNG SDS CO., LTD., Seoul (KR)

(72) Inventors: Ju Ho Lee, Seoul (KR); Jae Moo Hur, Seoul (KR); Dae Kyung Kim, Seoul (KR); Hwa Young Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 105 days.

(21) Appl. No.: 18/216,195

(22) Filed: Jun. 29, 2023

(65) Prior Publication Data
US 2024/0012734 A1 Jan. 11, 2024

(30) Foreign Application Priority Data
Jul. 8, 2022 (KR) .................. 10-2022-0084328

(51) Int. Cl.
*G06F 11/34* (2006.01)
(52) U.S. Cl.
CPC ................ *G06F 11/3447* (2013.01)
(58) Field of Classification Search
CPC ........... G06F 11/3447; G06F 11/0751; G06F 11/3419; G06F 11/3075; G06F 11/327;
(Continued)

(56) References Cited

U.S. PATENT DOCUMENTS 11,036,700 B2  6/2021 Huang et al.
11,222,287 B2 * 1/2022 Sevakula ............... G06N 3/082
(Continued)

FOREIGN PATENT DOCUMENTS

CN    111951560 A      11/2020
EP    3716075 A1 *   9/2020 .......... G06F 11/3442
(Continued)

OTHER PUBLICATIONS

Wscubetech, Riya (Why is backend more important than frontend?, Quora, 2020) https://www.quora.com/ Why-is-backend-more-important-than-frontend (Year: 2020).*
(Continued)

*Primary Examiner* — Matthew M Kim
*Assistant Examiner* — Kayo Lisa Rusin
(74) *Attorney, Agent, or Firm* — Sughrue Mion, PLLC

(57) ABSTRACT

Provided is a method for detecting an anomaly and a system, to which the method is applied. The anomaly detection method according to the embodiment of the present disclosure is a method performed by at least one computing device and comprises obtaining a plurality of models trained to detect an anomaly for different monitoring items, wherein input data of the models include at least one identification field for identifying an anomaly detection target, forming at least one model group by grouping models having a common identification field in the input data among the plurality of models, and detecting an anomaly of a detection target identified by a common identification field of the model group based on a detection result of a model group, wherein the input data of the models may include at least one identification field for identifying an anomaly detection target.

14 Claims, 7 Drawing Sheets

(58) Field of Classification Search
CPC ... G06F 11/3452; G06F 11/3466; G06N 3/02; G06N 3/045
See application file for complete search history.

(56) References Cited

U.S. PATENT DOCUMENTS

| | | | | |
|---|---|---|---|---|
| 11,610,126 | B1* | 3/2023 | Heckerman | G06N 20/10 |
| 2008/0126413 | A1* | 5/2008 | Addleman | G06F 11/3447 |
| 2019/0303799 | A1* | 10/2019 | Gottin | G06N 20/20 |
| 2020/0174867 | A1* | 6/2020 | Mo | G06F 11/079 |
| 2021/0383271 | A1* | 12/2021 | Slinger | G06F 11/3409 |
| 2021/0406146 | A1* | 12/2021 | Lange | G06F 11/3068 |
| 2022/0103444 | A1* | 3/2022 | Ranjan | H04L 43/106 |
| 2022/0172037 | A1* | 6/2022 | Kang | G06N 3/044 |
| 2022/0198213 | A1* | 6/2022 | Kim | G06F 18/251 |
| 2022/0230094 | A1* | 7/2022 | Panitsas | G06F 11/3447 |
| 2022/0398182 | A1* | 12/2022 | Liu | G06F 11/3419 |
| 2023/0195591 | A1* | 6/2023 | Higginson | G06F 11/3452 702/186 |
| 2023/0205664 | A1* | 6/2023 | Higginson | G06F 11/3006 702/186 |
| 2023/0297645 | A1* | 9/2023 | Dasu | G06F 18/2193 706/45 |
| 2024/0054341 | A1* | 2/2024 | Reddy | G06F 11/3003 |
| 2024/0193068 | A1* | 6/2024 | Li | G06F 11/3452 |

FOREIGN PATENT DOCUMENTS

| | | |
|---|---|---|
| JP | 6909670 A | 7/2021 |
| JP | 2022-519228 A | 3/2022 |
| JP | 2022-522474 A | 4/2022 |
| KR | 10-1874085 B1 | 8/2018 |
| KR | 10-2267458 B1 | 6/2021 |
| KR | 10-2022-0045541 A | 4/2022 |

OTHER PUBLICATIONS

Combining terms with Boolean Operators (And, Or, Not) Clinical Information Access Portal, Mar. 16, 2022 via Wayback Machine, https://web.archive.org/web/20220316071428/https://www.ciap.health.nsw.gov.au/training/ebp-learning-modules/module2/combining-terms-with-boolean-operators-and-or-not.html (Year: 2022).*

The fin tech front-end and back-end conundrum article (Finley, 2022) https://www.finleycms.com/blog/understanding-fintech-front-ends-and-back-ends (Year: 2022).*

Neural Networks (IBM, captured by Wayback Machine on Dec. 16, 2021) https://web.archive.org/web/20211216205911/https://www.ibm.com/topics/neural-networks (Year: 2021).*

* cited by examiner

| machine learning training name: | description | reference field |
|---|---|---|
| api_analysis | API call time anomaly detection: | service.keyword, set.keyword  502  501 |
| | average SQL execution time anomaly detection: | |
| | average CPU occupancy time anomaly detection | |
| | average Memory usage anomaly detection | |
| app_error | anomaly detection for increased errors by categorizing application error log | mlcategory, 512 set.keyword, module.keyword |
| web_response_time | application response time anomaly detection | service_name, status, path  511 |

FIG. 5

METHOD AND SYSTEM FOR DETECTING ANOMALY BY USING GROUPED ARTIFICIAL INTELLIGENCE MODELS TRAINED TO DETECT AN ANOMALY IN A DETECTION TARGET

CROSS-REFERENCE TO RELATED APPLICATION

This application claims priority from Korean Patent Application No. 10-2022-0084328, filed on Jul. 8, 2022, in the Korean Intellectual Property Office, the disclosure of which is incorporated herein by reference in its entirety.

BACKGROUND

1. Field

The present disclosure relates to an anomaly detection method and a system, to which the method is applied.

2. Description of the Related Art

Recently, as the amount of data explodes due to the emergence of the 4th industrial revolution, data analysis technology is receiving great attention in various fields. Among them, the data analysis technology is receiving the most attention in the field of anomaly detection. Data analysis technology is also being used to detect anomalies in computing systems used for various purposes.

Conventionally, since anomalies were determined by one-dimensionally analyzing data output by the system (e.g., log data), there was a problem in that false positives for system anomalies frequently occurred.

Therefore, there is a need for a method for detecting anomalies in the system by multi-dimensionally analyzing the data output by the system and comprehensively determining the analysis result.

SUMMARY

A technical problem to be achieved through some embodiments of the present disclosure is to provide a method for accurately detecting an anomaly of a system by comprehensively determining the anomaly detection results of a plurality of artificial intelligence models.

Another technical problem to be achieved through some embodiments of the present disclosure is to provide a method for accurately grouping a plurality of artificial intelligence models related to each other.

Another technical problem to be achieved through some embodiments of the present disclosure is to provide a method for transmitting an alarm message including details of a system anomaly to a system administrator.

Another technical problem to be achieved through some embodiments of the present disclosure is to provide a method for accurately determining the weight given to each artificial intelligence model in comprehensively determining the anomaly detection results of a plurality of artificial intelligence models.

The technical problems of the present disclosure are not limited to the above-mentioned technical problems, and other technical problems not mentioned will be clearly understood by those skilled in the art from the following description.

Aspects of the present disclosure for solving the problems provide a method performed by a computing system for detecting an anomaly. The method may include obtaining a plurality of models trained to detect an anomaly for different monitoring items, wherein input data of the plurality of models include at least one identification field for identifying an anomaly detection target, forming at least one model group by grouping models having a common identification field in the input data among the plurality of models and detecting an anomaly of a detection target identified by a common identification field of a model group based on a detection result of the model group.

In some embodiments, the detection target may be associated with a target system, and the identification field may include at least one of an identification field of a service unit provided by the target system, an identification field of a service time unit, or an identification field of a server group unit constituting the target system.

In some embodiments, models belonging to the model group may be trained to detect an anomaly for a plurality of detection targets distinguished by the common identification field, the detecting the anomaly of the detection target may include determining a detection target indicated by a value of the common identification field among the plurality of detection targets and determining whether the anomaly occurs in the determined detection target based on the detection result of the model group.

In some embodiments, detecting the anomaly of the detection target may include determining whether the anomaly occurs by combining detection results of the model group according to a combination condition set in the model group.

In some embodiments, the model group may include a first model and a second model, the set combination condition may be an AND condition, determining whether the anomaly occurs may include summing an anomaly score of the first model and an anomaly score of the second model based on a weight of each model and determining that the anomaly has occurred in response to determining that the summed anomaly score is equal to or greater than a reference value.

In some embodiments, the detection target of each model may be associated with a target system including multi-tiers, the multi-tiers may include a front-end tier and a back-end tier, the weight of each model may be determined based on a tier, in which the detection target of each model is located among the multi-tiers, the weight may be determined as a greater value as the detection target is located closer to a backend tier.

In some embodiments, the detection target of each model may be associated with a target system that provides a plurality of services to a user, the weight of each model may be determined based on importance of a service associated with the detection target of each model among the plurality of services.

In some embodiments, the detection target of each model may be associated with a target system that provides a plurality of services to a user, the weight of each model may be determined based on a difference between main use time of the user for a service associated with the detection target of each model among the plurality of services and anomaly detection time.

In some embodiments, the model group may include a first model and a second model, the set combination condition may be an OR condition, determining whether the anomaly occurs may include determining whether the anomaly occurs based on a greater score among an anomaly score of the first model and an anomaly score of the second model.

The method may further include in response to determining that the anomaly is detected, transmitting an alarm message to an administrator, the alarm message may include a monitoring item of each model belonging to the model group, an anomaly score of each model, an analysis result of the anomaly score of each model and a final anomaly score calculated based on the anomaly score of each model.

Aspects of the present disclosure for solving the problems provide a system for detecting an anomaly. The system may include one or more processors and a memory configured to store one or more instructions, the one or more processors, by executing the stored one or more instructions, perform: obtaining a plurality of models trained to detect an anomaly for different monitoring items, wherein input data of the plurality of models include at least one identification field for identifying an anomaly detection target, forming at least one model group by grouping models having a common identification field in the input data among the plurality of models and detecting an anomaly of a detection target identified by a common identification field of a model group based on a detection result of the model group.

In some embodiments, the detection target may be associated with a target system, and the identification field may include at least one of an identification field of a service unit provided by the target system, an identification field of a service time unit, or an identification field of a server group unit constituting the target system.

In some embodiments, models belonging to the model group may be trained to detect an anomaly for a plurality of detection targets distinguished by the common identification field, detecting the anomaly of the detection target may include determining a detection target indicated by a value of the common identification field among the plurality of detection targets and determining whether the anomaly occurs in the determined detection target based on the detection result of the model group.

In some embodiments, detecting the anomaly of the detection target may include determining whether the anomaly occurs by combining detection results of the model group according to a combination condition set in the model group.

In some embodiments, the model group may include a first model and a second model, the set combination condition may be an AND condition, determining whether the anomaly occurs may include summing an anomaly score of the first model and an anomaly score of the second model based on a weight of each model and determining that the anomaly has occurred in response to determining that the summed anomaly score is equal to or greater than a reference value.

In some embodiments, the detection target of each model may be associated with a system including multi-tiers, the multi-tiers may include a front-end tier and a back-end tier, the weight of each model may be determined based on a tier, in which the detection target of each model is located among the multi-tiers, the weight may be determined as a greater value as the detection target is located closer to a backend tier.

In some embodiments, the detection target of each model may be associated with a target system that provides a plurality of services to a user, the weight of each model may be determined based on importance of a service associated with the detection target of each model among the plurality of services.

In some embodiments, the detection target of each model may be associated with a target system that provides a plurality of services to a user, the weight of each model may be determined based on a difference between main use time of the user for a service associated with the detection target of each model among the plurality of services and anomaly detection time.

In some embodiments, the model group may include a first model and a second model, the set combination condition may be an OR condition, determining whether the anomaly occurs may include determining whether the anomaly occurs based on a greater score among an anomaly score of the first model and an anomaly score of the second model.

Aspects of the present disclosure for solving the problems provide a non-transitory computer-readable recording medium storing computer program executable by at least one processor to perform: obtaining a plurality of models trained to detect an anomaly for different monitoring items, wherein input data of the plurality of models include at least one identification field for identifying an anomaly detection target, forming at least one model group by grouping models having a common identification field in the input data among the plurality of models and detecting an anomaly of a detection target identified by a common identification field of a model group based on a detection result of the model group.

BRIEF DESCRIPTION OF THE DRAWINGS

These and/or other aspects will become apparent and more readily appreciated from the following description of the embodiments, taken in conjunction with the accompanying drawings in which:

FIG. 5 is a diagram for illustratively describing an anomaly detection model grouping step shown in FIG. 3;

DETAILED DESCRIPTION

Figure 1:
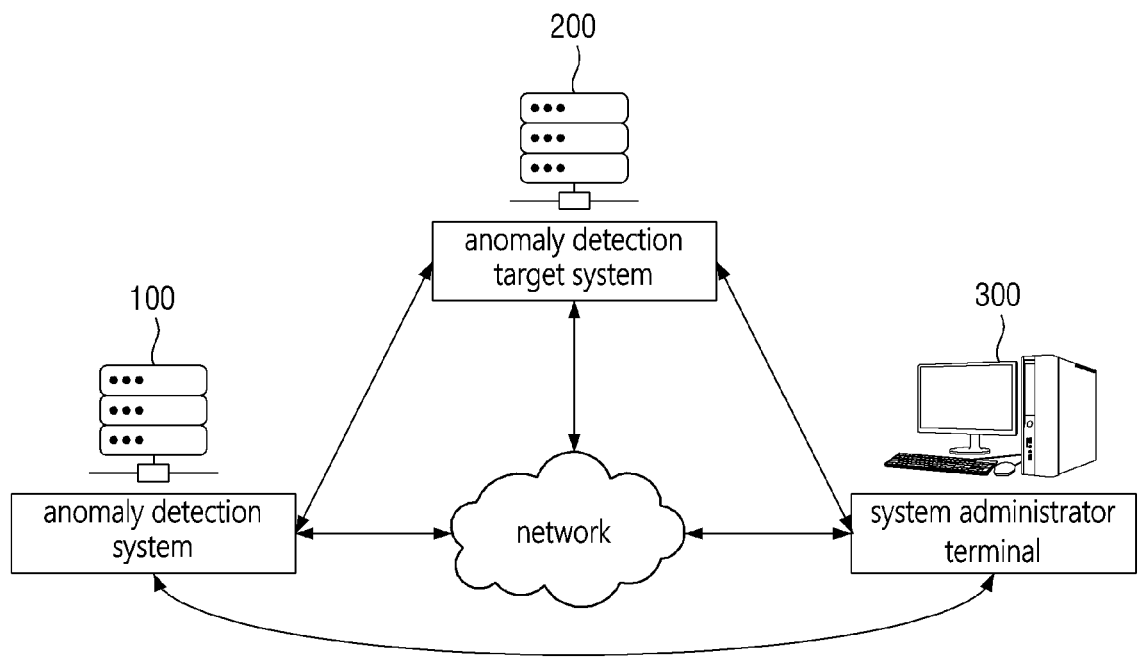
FIG. 1 illustrates an exemplary environment, to which an anomaly detection system according to an embodiment of the present disclosure may be applied.

Hereinafter, example embodiments of the present disclosure will be described with reference to the attached drawings. Advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will be defined by the appended claims and their equivalents.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Prior to description of various embodiments of the present disclosure, terms used in the following embodiments will be clarified.

In the following embodiments, the 'detection field' is a field that can be used to identify a specific detection target among a plurality of detection targets. For example, assuming that there is one model that detects anomalies for a plurality of server groups, if the value of the server group identification field input to the model is 1, server group 1 may be identified as the detection target.

In the following embodiments, the 'anomaly score' may mean a value expressing the probability of occurrence of an anomaly in a detection target as a quantitative value.

Hereinafter, several embodiments of the present disclosure are described with reference to the drawings.

FIG. 1 is a diagram illustrating an environment, to which an anomaly detection system according to an embodiment of the present disclosure may be applied.

As shown in FIG. 1, the anomaly detection system 100 according to the present embodiment can detect an anomaly occurring in the target system 200.

It can be understood that the anomaly detection system 100 and the target system 200 are separate systems. However, in some embodiments, the anomaly detection system 100 may be some component of the target system 200.

Figure 2:
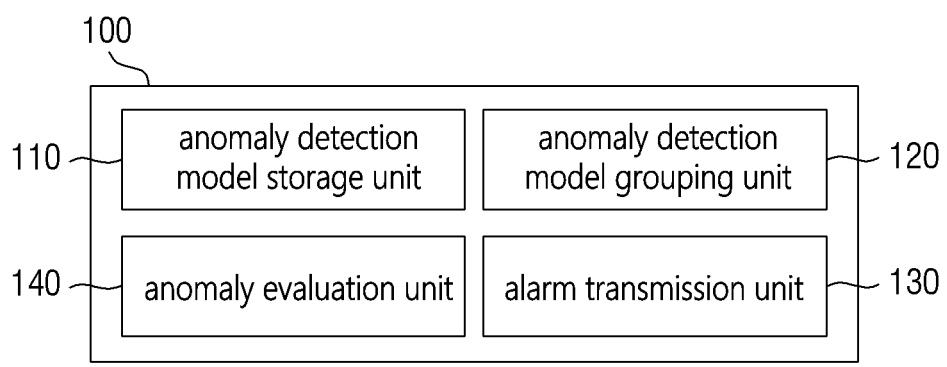
FIG. 2 is an exemplary block diagram for describing an anomaly detection system according to an embodiment of the present disclosure.

Hereinafter, with reference to FIGS. 1 and 2, each component shown will be described in more detail.

The administrator terminal 300 is an administrator terminal that manages the target system 200. The administrator terminal 300 may transmit and receive data with the target system 200 and the anomaly detection system 100 according to the needs of the administrator. For example, the administrator terminal 300 may request anomaly detection for a specific component of the target system 200 to the anomaly detection system 100 and receive a request result.

The administrator terminal 300 may receive an alarm message including detailed contents related to the anomaly of the target system 200 from the anomaly detection system 100 according to an embodiment of the present disclosure.

The target system 200 may be a system that provides a specific service to a user. The target system 200 may transmit log data for various monitoring items to the anomaly detection system 100. In some embodiments of the present disclosure, examples of monitoring items may include, but are not limited to, throughput, response speed, queue congestion, latency, and CPU utilization.

The anomaly detection system 100 may obtain a plurality of models (i.e., anomaly detection models) trained to detect anomalies for different monitoring items. Also, the input data of the models may include at least one identification field for identifying an anomaly detection target. In addition, the obtained plurality of models may be stored in the anomaly detection model storage unit 110 shown in FIG. 2.

The anomaly detection system 100 may group the obtained plurality of models based on an identification field. The operation of grouping the plurality of models may be performed by the anomaly detection model grouping unit 120, and a method of performing the operation will be described later. In addition, in order to help understanding of the present disclosure, a set of models generated as a result of grouping the models will be described as a model group.

The anomaly detection system 100 may detect an anomaly for a detection target of a model group based on a detection result of the model group. It can be understood that the detection target is at least one or more of the components of the target system 200. Also, the operation of detecting the anomaly may be performed by the anomaly evaluation unit 140.

According to an embodiment of the present disclosure, the anomaly detection system 100 may transmit content related to the anomaly detected in the target system 200 to the administrator terminal 300 in the form of an alarm message. In some embodiments of the present disclosure, the content of the alarm message may be exemplified as including information on whether an anomaly occurs in the target system 200 and a system anomaly score, but is not limited thereto. Also, the operation of transmitting the alarm message may be performed by the alarm transmission unit 130 shown in FIG. 2.

So far, the configuration and operation of the anomaly detection system 100 and exemplary environments to which the anomaly detection system 100 can be applied have been described with reference to FIGS. 1 and 2.

Referring to FIGS. 3 to 7, an anomaly detection method according to another embodiment of the present disclosure will be described in more detail. Hereinafter, steps to be described in some flowcharts may be understood to be performed by the anomaly detection system 100 unless otherwise specified.

Figure 3:
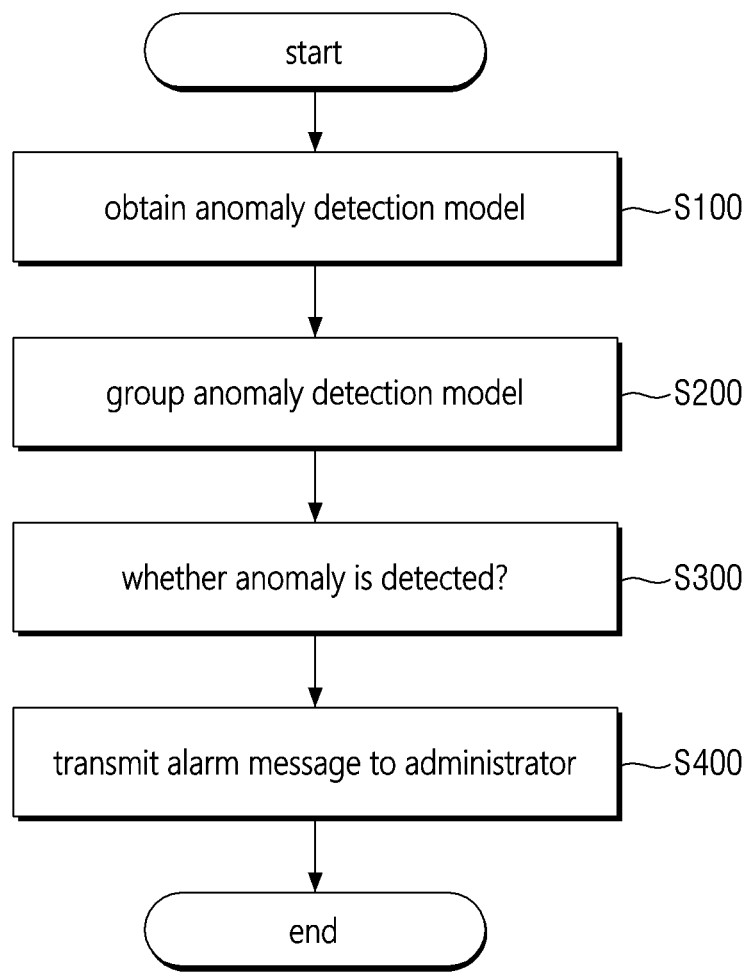
FIG. 3 is a flowchart of a method for detecting anomalies according to another embodiment of the present disclosure.

FIG. 3 is a flowchart of a method for detecting an anomaly according to the present embodiment.

In step S100 shown in FIG. 3, the anomaly detection system 100 may obtain a plurality of anomaly detection models. The anomaly detection model may be a model trained to detect (predict) an anomaly for a monitoring item associated with the target system 200. For example, the anomaly detection model may be a model trained to perform anomaly detection on response speed, a model trained to perform anomaly detection on CPU utilization, and the like. The anomaly detection model may receive monitoring data (i.e., data on monitoring items) and output an anomaly score indicating a degree of anomaly. The anomaly score is a probability value of occurrence of an anomaly, and may be, for example, a confidence score output by a model or a value obtained by processing the confidence score.

In some embodiments, monitoring data input to the anomaly detection model (or training data of the model) may include an identification field. The identification field may refer to a field used to identify a detection target. By using the identification field, there is no need to build an anomaly detection model for each detection target, and a single anomaly detection model can perform anomaly detection for multiple detection targets. For example, suppose that detection targets are a first service (or first server group) and a second service (or first server group) provided by the target system 200. In this case, the anomaly detection model may identify the service (or server group) to be detected through the service identification field (or server group identification field) of the input monitoring data, and perform the anomaly detection for the identified service (or server group).

Next, in step S200, the anomaly detection system 100 may group the plurality of anomaly detection models based on a common identification field. That is, the anomaly detection system 100 may determine relevancy (or correlation) between anomaly detection models using a common identification field, and may group models with high relevancy. The step of grouping the plurality of anomaly detection models will be described with reference to FIGS. 4 and 5.

Figure 4:
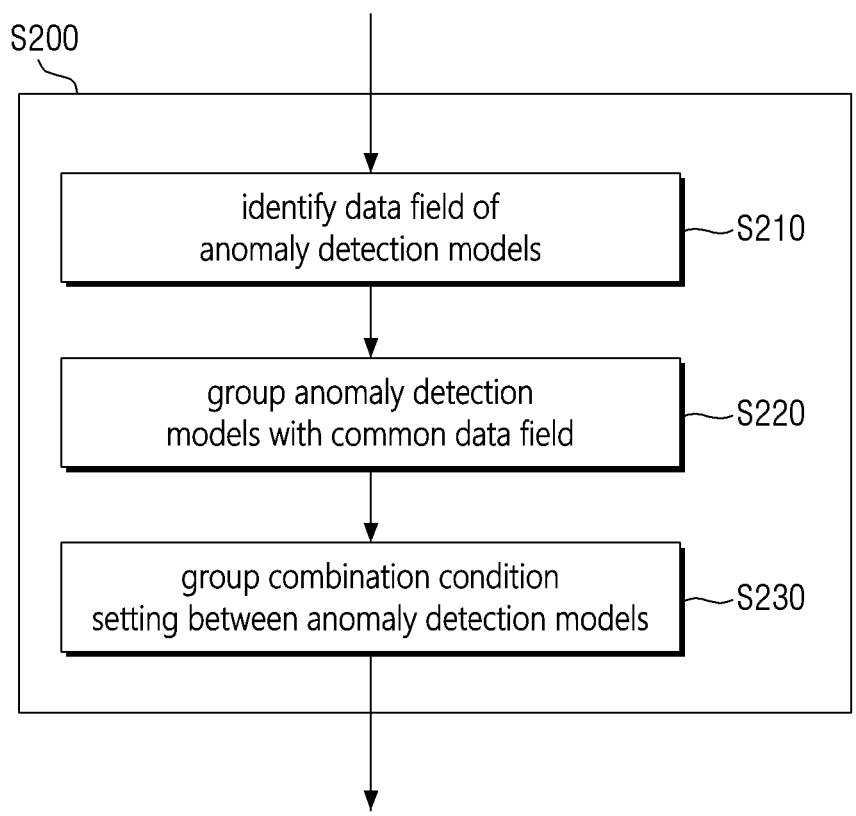
FIG. 4 is a flowchart for describing in detail the anomaly detection model grouping step shown in FIG. 3.

Referring to FIG. 4, in step S210, the anomaly detection system 100 may determine a common identification field of the obtained plurality of anomaly detection models. The identification field will be described with reference to FIG. 5.

Referring to the table in FIG. 5, 'api_analysis,' one of the anomaly detection models (the 'machine learning training name' in the table), receives 'service.keyword' identification field (501, e.g., service name field for identifying a service) and 'set.keyword' identification field (502, e.g., server group name field for identifying a server group) related to the detection target (i.e., the target for which the anomaly is detected) when performing anomaly detection. Therefore, the anomaly detection system 100 may specify which service (or server group providing the service) and which server group are to be detected based on the values of the 'service.keyword' identification field 501 and 'set.keyword' identification field 502.

In step S220, the anomaly detection system 100 may group a plurality of anomaly detection models having a common identification field. As a result of grouping, at least one model group may be formed. For example, referring to FIG. 5, since the 'set.keyword' identification field 502 of the 'api_analysis' anomaly detection model and the 'set.keyword' identification field 512 of the 'app_error' anomaly detection model are common identification fields, the 'api_analysis' anomaly detection model and the 'app_error' anomaly detection model can be grouped into one model group.

For another example, since none of the identification fields 'service_name' 511, 'status,' and 'path' of the 'web_response_time' anomaly detection model shown in FIG. 5 overlap with the identification field of the api_analysis model, the 'api_analysis' anomaly detection model and the 'web_response_time' anomaly detection model cannot be grouped into one model group.

According to this embodiment, one anomaly detection model can detect (or be trained to detect) anomalies for a plurality of detection targets using an identification field. Therefore, there is no need to build a separate anomaly detection model for each detection target, and thus the computational cost required for model build can be greatly reduced.

In step S230, the anomaly detection system 100 may set a combination condition for at least one model group. Here, the combination condition may be a condition for determining a calculation method (or combination method) of an anomaly score output by a plurality of anomaly detection models included in the same model group. The combination condition may include, for example, an AND condition and an OR condition, but is not limited thereto.

In some embodiments related to step S230, the anomaly detection system 100 may set the combination condition for the model group to AND.

In some other embodiments related to step S230, the anomaly detection system 100 may set the combination condition for the model group to OR.

In some other embodiments related to step S230, the anomaly detection system 100 may set a plurality of combination conditions for a model group including three or more anomaly detection models. For example, the combination condition between the A anomaly detection model and the B detection model included in the corresponding model group may be set to AND, and the combination condition between the A anomaly detection model, the B anomaly detection model, and the C anomaly detection model may be set to OR. In this case, the anomaly detection system 100 may calculate the final anomaly score of the corresponding model group in the form of '(A AND B) OR C.'

According to the present embodiment, the anomaly detection system 100 flexibly combines the detection (prediction) results (e.g., anomaly score) of a plurality of anomaly detection models to perform a determination, so that ultimately the effect of minimizing misjudgment about the anomaly can be achieved.

So far, the method of grouping a plurality of anomaly detection models by the anomaly detection system 100 has been described in detail. Hereinafter, the description continues with reference to FIG. 3.

In step S300, the anomaly detection system 100 may determine whether or not the anomaly occurs in the target system 200 based on the detection result of the model group. This step will be described in more detail with reference to FIGS. 6 and 7.

Figure 6:
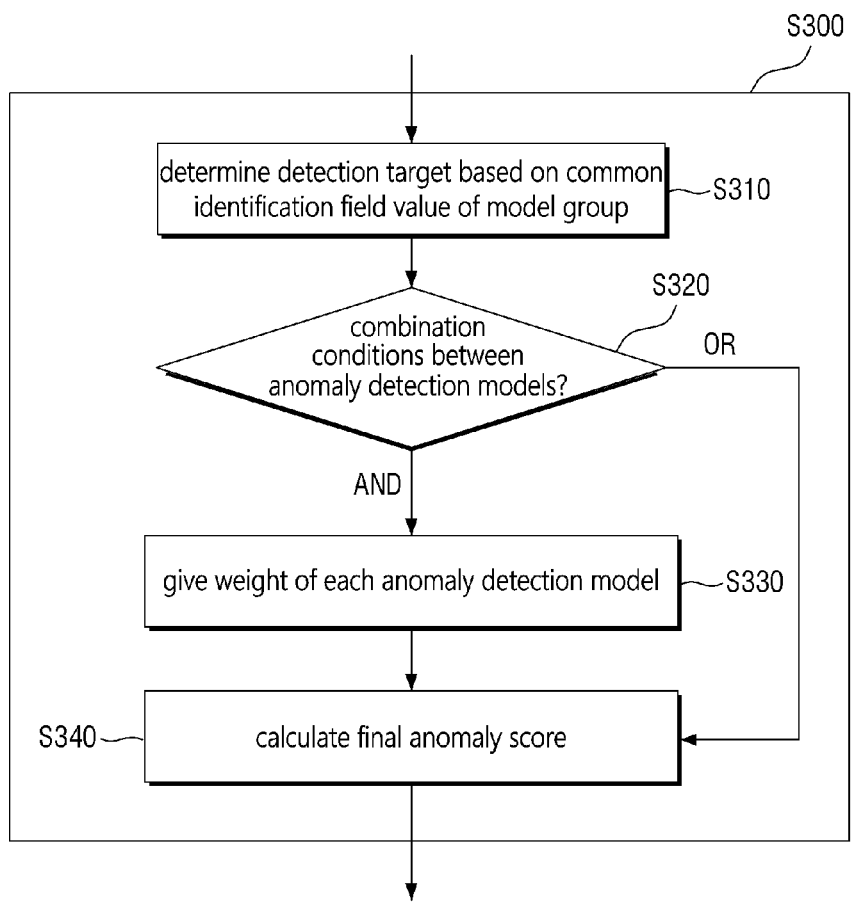
FIG. 6 is a flowchart for describing in detail the anomaly detection step shown in FIG. 3.

In step S310 of FIG. 6, the anomaly detection system 100 may specify (identify) a detection target by referring to a common identification field value of the model group. For example, referring to FIG. 5, assuming that the 'api_analysis' model and the 'app_error' model are included in one model group, the anomaly detection system 100 can specify which server group is to be detected by referring to values of a common 'set.keyword' identification field (502,512).

In step S320, the anomaly detection system 100 may determine what combination condition is for the model group.

In step S330, in response to determining that the combination condition corresponds to AND, the anomaly detection system 100 may give (determine) a weight to the anomaly score output by each of the plurality of anomaly detection models included in the model group.

In some embodiments related to step S330, the anomaly detection system 100 may give a weight to the anomaly score based on the tier, in which the detection target of each model is located. For example, referring to FIG. 7, the tier may be divided into a service (front-end) tier 710, a common (middle) tier 720, and a back-end tier, but is not limited thereto. In this embodiment, as the detection target is located closer to the backend tier, a higher weight may be given to the associated model (i.e., the anomaly score of the corresponding model). This is because anomalies generated in the backend tier generally require more time costs and have a greater impact on the service. According to the present embodiment, an effect of quickly avoiding a fatal service failure can be achieved by early detection and action of an anomaly that has a large impact on the service (e.g., an anomaly in the backend tier).

In some other embodiments related to step S330, the anomaly detection system 100 may give a weight to the anomaly score based on the importance of the service related to the detection target of each model.

Here, the importance of the service may be a value preset by an administrator, or may be a value dynamically determined based on the user's service use frequency (e.g., the average number of users using the service for a certain period of time, the average number of uses of users using the service for a certain period of time, etc.). For example, when the importance of the first service provided by the target system 200 is 90 and the importance of the second service is 40, the anomaly detection system 100 may give a higher weight to an anomaly detection model associated with the first service (i.e., an anomaly score of model) than an anomaly detection model associated with the second service.

Meanwhile, according to another embodiment of the present disclosure, the importance of the service may be a value set based on the main time that the user uses the service. For example, assuming that the first service is a service with a higher usage rate by users during the week than the second service, the anomaly detection system 100 may give a higher weight to the anomaly detection model associated with the first service than the anomaly detection model associated with the second service when determining an anomaly during the week.

In some embodiments of the present disclosure, it is exemplified that the importance of the service is determined by the frequency of service use and the time of service use, but is not limited thereto, and it can be any method as long as the importance of the service is determined based on the user's service use information.

If the administrator gives weight separately to a plurality of detection targets, it does not only causes waste of manpower costs, but also the anomaly detection system 100 may be set to react sensitive to relatively unimportant system anomalies due to the administrator's immaturity. According to the present embodiment, since the administrator can detect and take measures for an anomaly in an important service to the user among services provided by the target system 200 at an early stage, the effect of maximizing user satisfaction can be achieved.

Next, in step S340, the anomaly detection system 100 may calculate a final anomaly score for the specified detection target in consideration of a combination condition set for a model group. Then, based on the calculated final anomaly score, the anomaly detection system 100 may determine whether an anomaly has occurred in a specific detection target. Determination of whether anomaly occurs may be determined according to whether the final anomaly score exceeds a predefined threshold, but the scope of the present disclosure is not limited thereto.

In some embodiments related to step S340, in response to determining that the combination condition corresponds to AND, the anomaly detection system 100 may calculate the final anomaly score by summing each anomaly score output from the anomaly detection models based on the weights (that is, the weight given in step S330).

Figure 7:
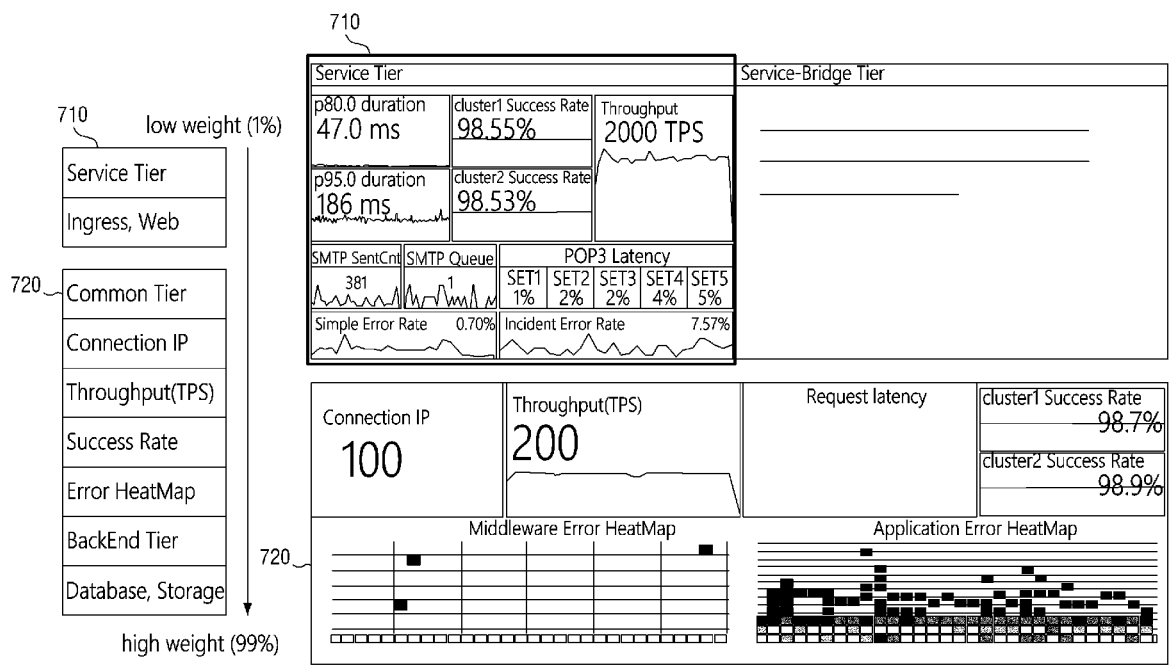
FIG. 7 is diagrams for illustratively describing the anomaly detection step shown in FIG. 3.

For example, referring to FIG. 7, the anomaly detection system 100 may add the value of 28, which is calculated by multiplying the anomaly score of 70 output by the first detection target located in the service tier 710 by the weight of 0.4, and the value of 32, which is calculated by multiplying the anomaly score of 40 output by the second detection target located in the common tier 720 by the weight of 0.8, to calculate the final anomaly score of 50. On the other hand, when the threshold predefined in the anomaly detection system 100 is 60, the anomaly detection system 100 may finally determine that no anomaly occurred in the target system 200 in response to determining that the calculated final anomaly score does not exceed the threshold.

In some other embodiments related to step S340, the anomaly detection system 100 may determine the maximum value among the anomaly scores output from the anomaly detection models to the final anomaly score in response to determining that the combination condition between the models corresponds to OR.

So far, the anomaly detection step S300 shown in S300 of FIG. 3 has been described in detail. Hereinafter, the description continues with reference to FIG. 3.

In step S400, the anomaly detection system 100 may transmit an alarm message to an administrator in response to determining that an anomaly occurs in the target system 200. According to some embodiments of the present disclosure, the alarm message may be transmitted to the administrator terminal 300.

In some embodiments related to step S400, the alarm message may comprise information on a monitoring item (e.g., response speed, CPU usage rate, etc.) of each model included in the model group, an anomaly score output by each model, an analysis result of an anomaly score of each model (e.g., current response speed is somewhat different from normal response speed, current response speed is somewhat different from response speed in the same time period, etc.) and the final anomaly score calculated based on an anomaly score of the each model.

So far, the anomaly detection method according to an embodiment of the present disclosure has been described in detail.

Figure 8:
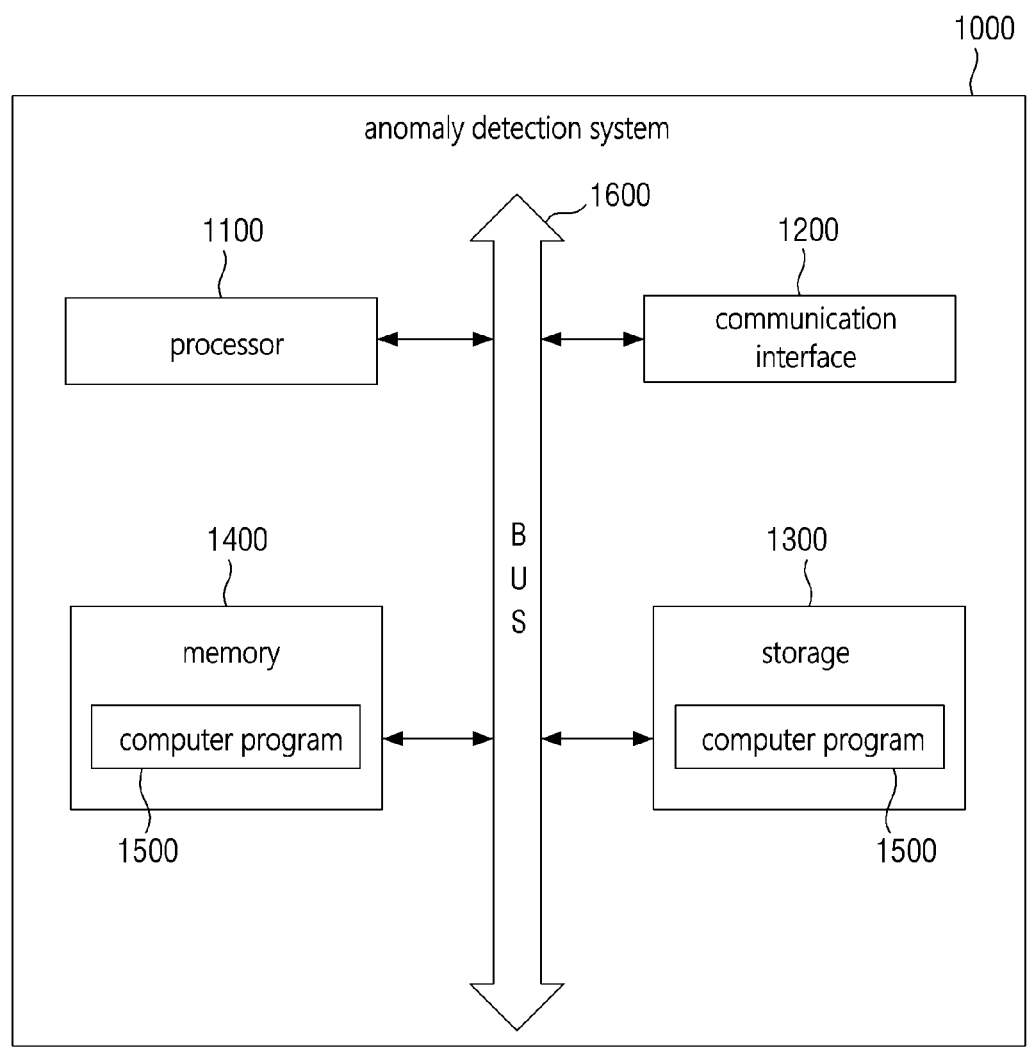
FIG. 8 is a hardware configuration diagram of an anomaly detection system according to an embodiment of the present disclosure.

FIG. 8 is a hardware configuration diagram of an anomaly detection system 1000 according to some embodiments of the present disclosure. The anomaly detection system 1000 shown in FIG. 8 may indicate, for example, the anomaly detection system 100 described with reference to FIG. 1.

The anomaly detection system 1000 includes one or more processors 1100, a system bus 1600, a communication interface 1200, a memory 1400 for loading a computer program 1500 executed by the processor 1100, and a storage 1300 for storing the computer program 1500.

The processor 1100 controls the overall operation of each component of the anomaly detection system 1000. The processor 1100 may perform an operation for at least one application or program for executing a method/operation according to various embodiments of the present disclosure. The memory 1400 stores various data, commands and/or information. The memory 1400 may load one or more computer programs 1500 from storage 1300 to execute methods/operations according to various embodiments of the present disclosure.

The bus 1600 provides a communication function between components of the anomaly detection system 1000.

The communication interface 1200 supports internet communication of the anomaly detection system 1000.

The storage 1300 may non-temporarily store one or more computer programs 1500.

The computer program 1500 may include one or more instructions, in which methods/operations according to various embodiments of the present disclosure may be implemented. When the computer program 1500 is loaded into the memory 1400, the processor 1100 may execute the one or more instructions to perform methods/operations according to various embodiments of the present disclosure.

For example, the computer program 1500 may include instructions for an operation of obtaining a plurality of models trained to detect anomalies for different monitoring items, an operation of forming at least one model group by grouping models having a common identification field in the input data among the plurality of models, and an operation of detecting an anomaly for a detection target identified by a common identification field of the model group based on the detection result of the model group.

In some embodiments, the anomaly detection system 1000 may be configured using one or more physical servers included in a server farm based on a cloud technology such as a virtual machine.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the example embodiments without substantially departing from the principles of the present disclosure. Therefore, the disclosed example embodiments of the disclosure are used in a generic and descriptive sense only and not for purposes of limitation.

What is claimed is:

1. A method performed by a computing system for detecting an anomaly comprising:
    obtaining a plurality of models trained to detect an anomaly for different monitoring items, wherein input data of the plurality of models include at least one identification field for identifying an anomaly detection target;
    forming at least one model group by grouping models having a common identification field in the input data among the plurality of models; and
    detecting an anomaly of a detection target identified by a common identification field of a model group based on a combination of detection results of the model group, in which in which a detection result of each model of the model group is multiplied by a corresponding weight,
    wherein the detection target is associated with a target system that provides a plurality of services to a user, and
    wherein a weight of each model is determined in a manner such that a greater value is determined, as the weight, based on an anomaly detection time falling within a main usage time interval, which is determined in advance as having a higher usage rate for a service associated with a corresponding model, and a lower value is determined, as the weight, based on the anomaly detection time falling outside the main usage time interval of the corresponding model.

2. The method of claim 1,
    wherein the at least one identification field includes at least one of an identification field of a service unit provided by the target system, an identification field of a service time unit, or an identification field of a server group unit constituting the target system.

3. The method of claim 1, wherein models belonging to the model group are trained to detect an anomaly for a plurality of detection targets distinguished by the common identification field, and
    wherein detecting the anomaly of the detection target comprises:
    determining the detection target indicated by a value of the common identification field among the plurality of detection targets; and
    determining whether the anomaly occurs in the determined detection target based on the combination of detection results of the model group.

4. The method of claim 1, wherein the model group includes a first model and a second model, and
    wherein determining whether the anomaly occurs comprises:
    summing an anomaly score of the first model, multiplied by a weight of the first model, and an anomaly score of the second model, multiplied by a weight of the second model; and
    determining that the anomaly has occurred in response to determining that the summed anomaly score is equal to or greater than a reference value.

5. The method of claim 4, wherein the target system comprises multi-tiers,
    wherein the multi-tiers include a front-end tier and a back-end tier, and
    wherein the weight of each model is further determined based on a tier, in which the detection target of each model is located among the multi-tiers, and a greater value is determined, as the weight, vas the detection target is located closer to a backend tier.

6. The method of claim 4,
    wherein the weight of each model is further determined based on a number of uses of the service associated with the corresponding model among the plurality of services.

7. The method of claim 1, further comprising:
    in response to determining that the anomaly is detected, transmitting an alarm message to an administrator,
    wherein the alarm message comprises:
    a monitoring item of each model belonging to the model group,
    an anomaly score of each model,
    an analysis result of the anomaly score of each model and a final anomaly score calculated based on the anomaly score of each model.

8. A system for detecting an anomaly comprising:
one or more processors; and
a memory configured to store one or more instructions,
wherein the one or more processors, by executing the stored one or more instructions, perform:
obtaining a plurality of models trained to detect an anomaly for different monitoring items, wherein input data of the plurality of models include at least one identification field for identifying an anomaly detection target,
forming at least one model group by grouping models having a common identification field in the input data among the plurality of models and
detecting an anomaly of a detection target identified by a common identification field of a model group based on a combination of detection results of the model group, in which in which a detection result of each model of the model group is multiplied by a corresponding weight,
wherein the detection target is associated with a target system that provides a plurality of services to a user, and
wherein a weight of each model is determined in a manner such that a greater value is determined, as the weight, based on an anomaly detection time falling within a main usage time interval, which is determined in advance as having a higher usage rate for a service associated with a corresponding model, and a lower value is determined, as the weight, based on the anomaly detection time falling outside the main usage time interval of the corresponding model.

9. The system of claim 8,
wherein the at least one identification field includes at least one of an identification field of a service unit provided by the target system, an identification field of a service time unit, or an identification field of a server group unit constituting the target system.

10. The system of claim 8, wherein models belonging to the model group are trained to detect an anomaly for a plurality of detection targets distinguished by the common identification field, and
wherein detecting the anomaly of the detection target comprises:
determining the detection target indicated by a value of the common identification field among the plurality of detection targets; and
determining whether the anomaly occurs in the determined detection target based on the combination of detection results of the model group.

11. The system of claim 8, wherein the model group includes a first model and a second model, and
wherein determining whether the anomaly occurs comprises:
summing an anomaly score of the first model, multiplied by a weight of the first model, and an anomaly score of the second model, multiplied by a weight of the second model; and
determining that the anomaly has occurred in response to determining that the summed anomaly score is equal to or greater than a reference value.

12. The system of claim 11, wherein the target system comprises multi-tiers,
wherein the multi-tiers include a front-end tier and a back-end tier, and
wherein the weight of each model is further determined based on a tier, in which the detection target of each model is located among the multi-tiers, and a greater value is determined, as the weight, vas the detection target is located closer to a backend tier.

13. The system of claim 11,
wherein the weight of each model is further determined based on a number of uses of the service associated with the corresponding model among the plurality of services.

14. A non-transitory computer-readable recording medium storing computer program executable by at least one processor to perform:
obtaining a plurality of models trained to detect an anomaly for different monitoring items, wherein input data of the plurality of models include at least one identification field for identifying an anomaly detection target;
forming at least one model group by grouping models having a common identification field in the input data among the plurality of models; and
detecting an anomaly of a detection target identified by a common identification field of a model group based on a combination of detection results of the model group, in which in which a detection result of each model of the model group is multiplied by a corresponding weight,
wherein the detection target is associated with a target system that provides a plurality of services to a user, and
wherein a weight of each model is determined in a manner such that a greater value is determined, as the weight, based on an anomaly detection time falling within a main usage time interval, which is determined in advance as having a higher usage rate for a service associated with a corresponding model, and a lower value is determined, as the weight, based on the anomaly detection time falling outside the main usage time interval of the corresponding model.

* * * * *